US006923339B2

(12) United States Patent
Lu

(10) Patent No.: US 6,923,339 B2
(45) Date of Patent: Aug. 2, 2005

(54) SEALING PLUG FOR A WATER GLOBE

(76) Inventor: Lay (Frank) Lu, 12248 Goleta Ave., Saratoga, CA (US) 95070

(*) Notice: Subject to any disclaimer, the term of this patent is extended or adjusted under 35 U.S.C. 154(b) by 392 days.

(21) Appl. No.: 10/325,182

(22) Filed: Dec. 20, 2002

(65) Prior Publication Data

US 2005/0061823 A1 Mar. 24, 2005

(51) Int. Cl.[7] .......................... A01G 5/04; A47G 7/02; B65D 23/12; B65D 39/04

(52) U.S. Cl. .......................... 220/801; 220/DIG. 19; 215/270; 215/271; 215/358; 47/69

(58) Field of Search .......................... 220/801, DIG. 19; 215/270, 271, 355, 358, 227, 381–384; 47/41.01, 69

(56) References Cited

U.S. PATENT DOCUMENTS 2,723,041 A * 11/1955 Hart-Still .................... 215/270
4,771,902 A * 9/1988 Teng .................... 215/227
4,901,875 A * 2/1990 Teng .................... 215/271
5,775,529 A * 7/1998 Lo .................... 215/270
5,875,577 A * 3/1999 Lu .................... 40/411
6,540,099 B2 * 4/2003 Lu .................... 220/801

* cited by examiner

*Primary Examiner*—Nathan J. Newhouse
(74) *Attorney, Agent, or Firm*—Roger C. Turner

(57) ABSTRACT

A sealing plug for a liquid-filled container having a lower opening therein with an extended skirt thereon. The plug comprises a peripheral cylindrical wall for sealingly engaging the skirt of the container. The plug further has a flanged annular base extending inward from the peripheral wall and has two or more supports extended upward therefrom, the supports each have an upper end for collectively supporting an ornament within the container. The plug further has a flexible inner wall extending upward from the annular base, to a height lower than the height of the supports, and contoured around and inboard of the supports. The plug finally has a flexible diaphragm extending across the upper end of the inner wall for compensating for changes in volume and pressure of the liquid within the container.

The plug is installed in the "as molded" configuration with the inner wall and diaphragm upward; and upon any expansion of the volume of the water within the globe, the diaphragm flexes and can be inverted downward about the annular base to compensate for the variation in the volume, while the supports remain fixed supporting the ornament within the container.

12 Claims, 4 Drawing Sheets

SEALING PLUG FOR A WATER GLOBE

BACKGROUND OF THE INVENTION

The invention relates to a liquid filled container referred to as a "water globe" or "snow globe"; and more particularly, to an improved sealing plug for such a container.

This invention is a further improvement on an earlier invention by the same inventor entitled Sealing Plug for a Water Globe, Ser. No. 09/795,994, (issued on Apr. 1, 2003 as U.S. Pat. No. 6,540,099) and is incorporated herein by reference.

A water globe typically comprises a transparent spherical globe that is filled with water and containing a small ornamental figurine. By means of the water and the convex lens effect of the sphere, the small ornament within the water globe generates an enlarged view that appears to fill the globe. The liquid usually further includes tiny suspensible particles, so that when the globe is shaken, the particles are dynamically suspended in the liquid and momentarily provide the illusion of a snowy scene around the ornament. Some snow globes include motors or pumps to continuously move the ornament or agitate the fluid to provide an interesting display.

A conventional seal for a water globe consists of a hollow cylindrical rubber plug having an enclosed flat upper surface. It is well known that water globes may undergo extreme temperature changes, particularly during shipping, that results in expansion and contraction of the water within the container, and sometimes resulted in loss of water and the formation of air bubbles within the globe. The present inventor has minimized this problem with his earlier invention comprising a plug having an expandable diaphragm for compensating for changes in volume within the globe.

FIGS. 1–2 illustrate a water globe utilizing the inventor's prior art sealing plug, and shows a transparent crystalline spherical globe 10 that has a large circular opening 12 at the bottom thereof with an extended cylindrical skirt 14. The globe is filled with a liquid, primarily water sometimes including an alcohol anti-freeze mixture, and is sealed at the skirt with a hollow cylindrical rubber plug 16.

The plug has a cylindrical wall 18 having about three or four extended supports 20, evenly spaced at the upper end of the wall that supports a plastic disc 21 that further supports a small decorative ornament 22 within the globe. The plug includes a flexible diaphragm 24 connected to the peripheral wall by a recessed annular channel 26. FIG. 1 illustrates the plug in the "as molded" configuration with the internal liquid (and internal pressure) acting on the upper surface of the plug. This configuration indicates the minimum internal volume and pressure within the globe.

FIG. 2 illustrates the flexibility and range of the diaphragm of the plug, to expand corresponding to variations in the internal volume of the water within the globe, to normalize any internal pressure that may be created by extreme environmental conditions. Any internal positive pressure on the diaphragm 24 causes the diaphragm to initially flex and bulge downwardly to normalize the volume of the globe. Under more extreme internal pressure, the diaphragm can pivot about the base of the annular channel 26 and invert downwardly (as shown) to significantly increase the internal capacity corresponding to the volume of the liquid within the globe, while the object 22 is securely supported within the globe on the plastic disc 21 attached to the extended supports 20 on the peripheral wall.

The plug with the flexible diaphragm is a significant improvement over the earlier prior art; however, the supports on the peripheral wall are relatively small and sometimes difficult to align for bonding to the plastic disc. Also, the disc, on the supports, extends to the outer diameter of the peripheral wall of the plug (and at the inner diameter of the skirt of the globe) and the plug is sometimes difficult to insert within the skirt of the globe. Also, the supports on the peripheral wall usually engage the skirt of the globe and tend to flex upon installation, and the bond at the plastic disc may be weakened and may subsequently become separated.

In view of the foregoing, it is an object of the present invention to provide an expandable robust sealing plug for a water globe, having supports for an object within the globe that are inboard and independent of the peripheral sealing wall, that is easily and reliably installed within a water globe.

It is another object to provide an expandable robust sealing plug for a water globe, having supports providing a cumulative large inboard area that do not require a plastic disc to support an object within the globe.

SUMMARY OF THE INVENTION

The foregoing objects are accomplished by an improved sealing plug, for a liquid-filled container having a lower opening therein with an extended skirt thereon. A first embodiment of the plug comprises a peripheral cylindrical wall for sealingly engaging the skirt of the container. The plug further has a flanged annular base extending from the midpoint of the peripheral wall inwardly and has three cylindrical supports extended upward therefrom, the supports each have an upper end for collectively supporting an ornament within the container. The plug further has a flexible inner wall extending upward from the annular base, to a height lower than the height of the supports, and is contoured around and inboard of the supports. The plug is enclosed with a flexible diaphragm extending across the upper end of the inner wall for compensating for changes in volume and pressure of the liquid within the container.

The plug is installed in the "as molded" configuration with the inner wall and diaphragm upward; and upon any expansion of the volume of the liquid within the globe, the diaphragm flexes and can be inverted downward about the annular base to compensate for the variation in the volume, while the supports remain fixed supporting the ornament within the container.

A second embodiment of the plug features the annular base extending inwardly from the bottom of the peripheral wall, and the supports having a generally rectangular or oval cross-section. The diaphragm also features a central aperture for sealingly engaging a shaft extendable through the plug into the container A third embodiment of the plug features four narrow rectangular supports, and the diaphragm features a large central aperture for sealingly engaging an object extended through the plug into the container.

Each of the embodiments further features the annular base having a molded in port to facilitate sealed access into the container.

It is further understood that the various features of the embodiments of the present invention may be selected and combined for specific application of the sealing plug for a water globe.

BRIEF DESCRIPTION OF THE DRAWINGS

While the novel features of the invention are set forth in the appended claims, the invention will be better understood along with other features thereof from the following detailed description taken in conjunction with the drawings, in which:

DETAILED DESCRIPTION OF THE INVENTION

Figure 2:
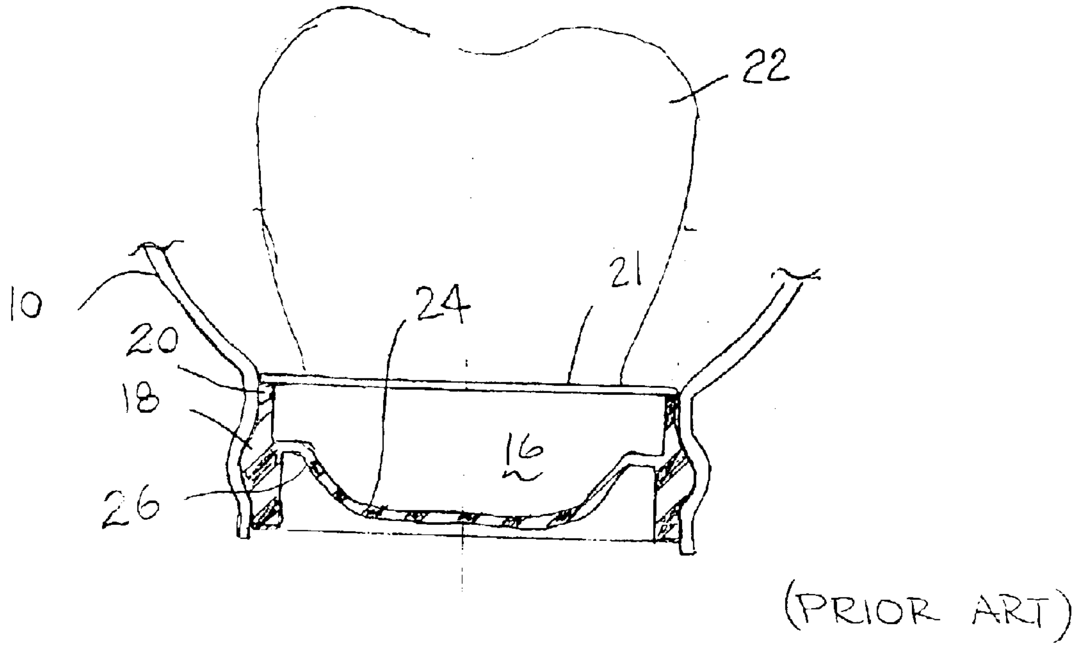
(PRIOR ART) FIG. 2
FIG. 2 is a partial view similar to FIG. 1 of a water globe and sealing plug of the prior art, in a maximum volume expanded orientation.
Figure 3:
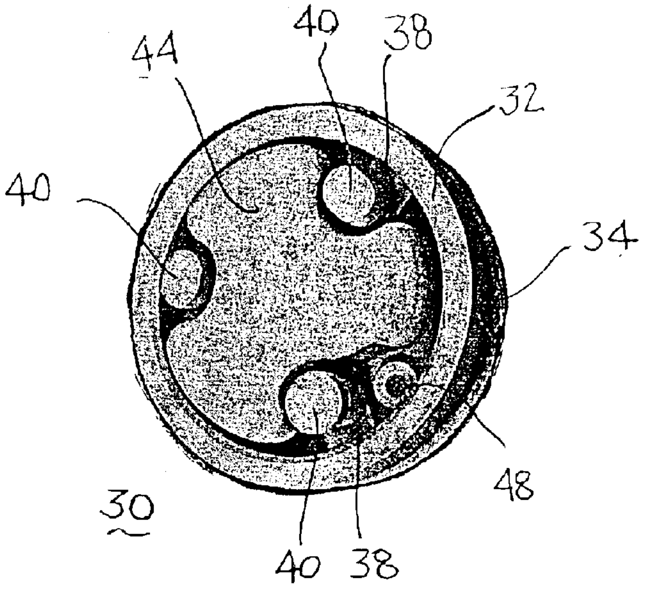
FIG. 3 is a top front isometric view of one embodiment of the sealing plug of the present invention.
Figure 4:
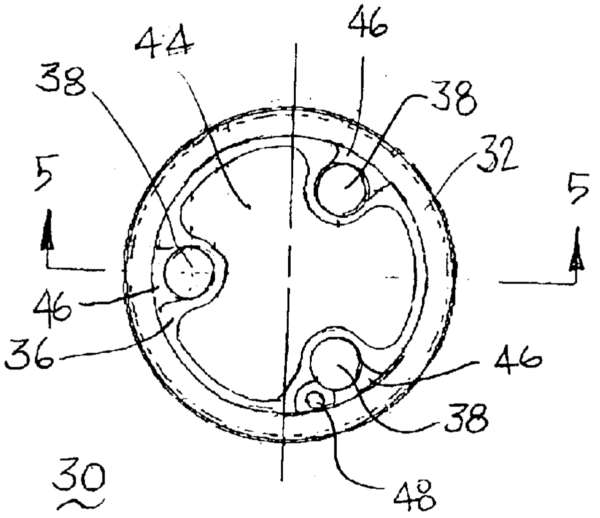
FIG. 4 is a top plane view of the embodiment shown in FIG. 3.
Figure 5:
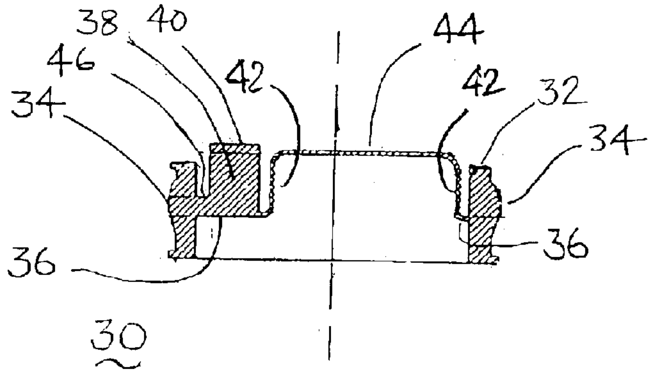
FIG. 5 is a sectional view taken along 5—5 of FIG. 4.
Figure 6:
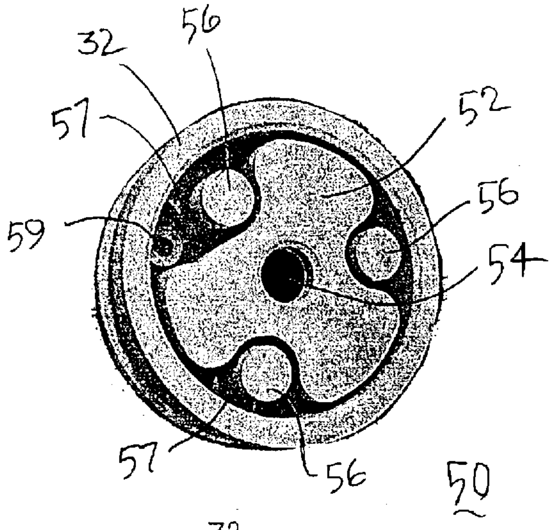
FIG. 6 is a top front isometric view of a second embodiment of the sealing plug of the present invention.

Referring also to FIGS. 3–5, there is illustrated an exemplary first embodiment of a sealing plug 30 of the present invention. The plug is utilized to seal a liquid filled container, such as the water globe 10, as discussed in reference to FIGS. 1–2 of the prior art sealing plug.

Water globes are produced in various sizes, and by means of example, the sealing plug of the present invention is illustrated and described in reference to a water globe 10 having a diameter of about 100 mm. The globe is typically formed of crystalline glass about 1 mm thick having a lower circular opening 12 of about 60 mm in diameter with a cylindrical skirt 14 extended about 20 mm below the opening. The inner surface of the cylindrical skirt includes an annular concave shape for retaining the plug, and the bottom end of the skirt provides a suitable base for supporting the globe.

The plug 30 is suitably molded of natural rubber or synthetic elastomeric compound having a generally cylindrical peripheral wall 32 having a length of about 25 mm, and having a convex outer diameter 34 complementary to the contoured inner diameter of the skirt, and is adapted to sealingly engage the shirt of the globe. The peripheral wall is relatively stiff having an average thickness of about 5 mm.

Figure 1:
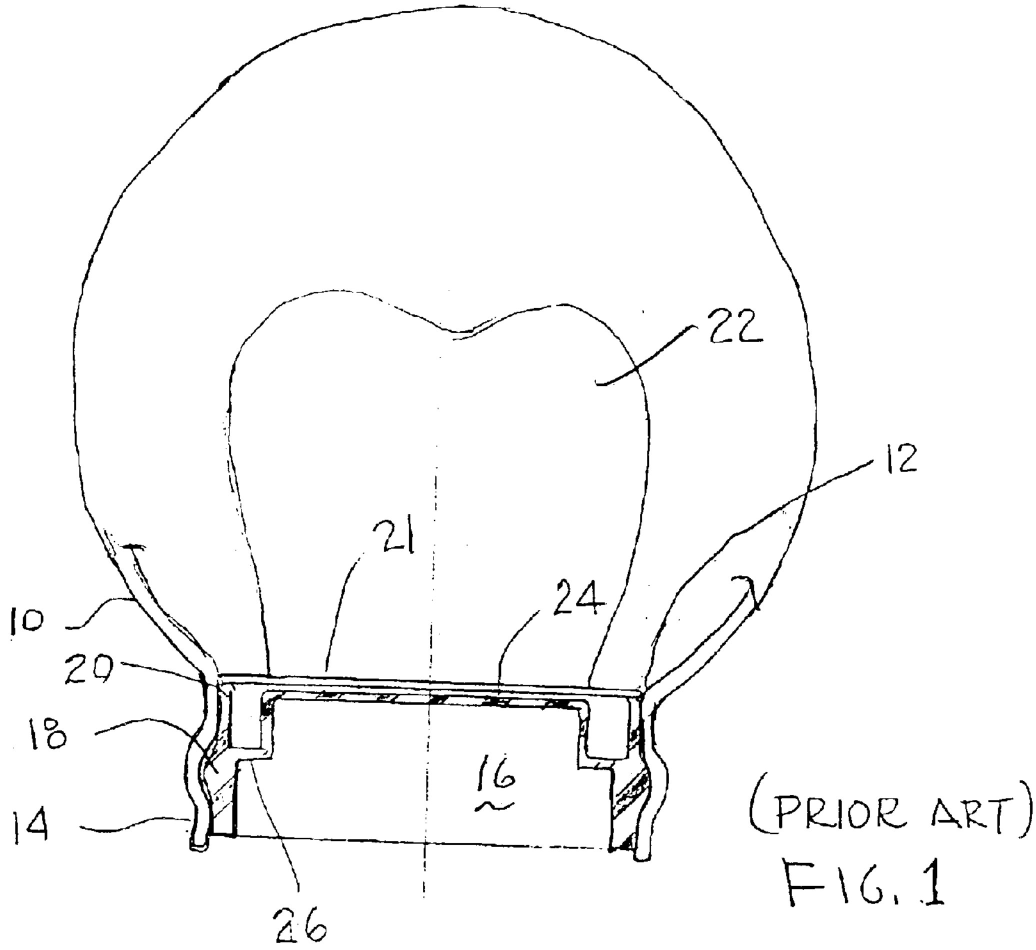
(PRIOR ART) FIG. 1
FIG. 1 is a front elevational view (shown partially in cross section) of a water globe and sealing plug of the prior art, in a minimum volume contracted orientation.
Figure 11:
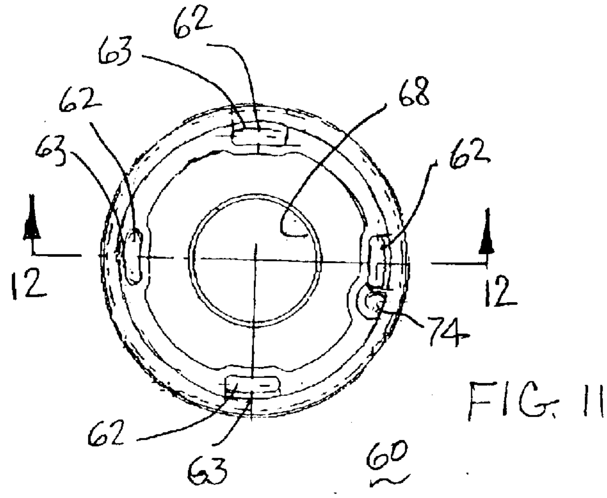
FIG. 11 is a top plane view of the embodiment shown in FIG. 10.

The peripheral wall has a flanged annular base 36 extending inward, with the base having three supports 38 extending upward therefrom, with each support having an upper end 40 for collectively supporting an ornament (not shown) within the container. The base of the ornament is securely bonded directly onto the upper ends of the supports. The FIGS. 3–5 illustrate a plug having three supports, however, an ornament could be supported on a plug having a single support, but usually having two or more supports, and typically three or four supports are utilized to support the ornament. The supports as shown in FIGS. 1–3 have a circular cross section about 10 mm in diameter, but a variety of rectangular or oral cross sections about 10 mm×5 mm (see FIGS. 7 and 11) may be utilized. The annular base includes a flexible inner wall 42 (see FIG. 5), extending upward having an upper end (in its "as molded" contracted orientation) to a height less than the upper end of the supports; and the plug is enclosed by a flexible diaphragm 44 extending across the upper end of the inner wall.

Figure 12:
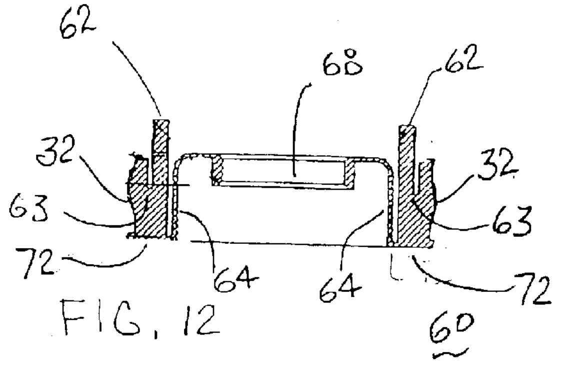
FIG. 12 is a sectional view taken along 12—12 of FIG. 1.
Figure 13:
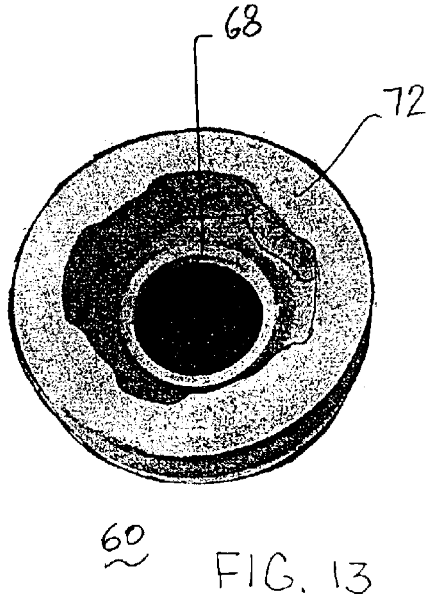
FIG. 13 is a bottom front isometric view of the third embodiment of the sealing plug of the present invention.

In a simple configuration, the annular base 36 extends a uniform distance inward of the supports 38, and the inner wall is cylindrical in shape, enclosed with a circular diaphragm. This configuration is not specifically illustrated, (but is similar to that shown on FIG. 12, to be discussed later), and it provides a set of supports that are inboard and independent of the peripheral wall 38, and provides a flexible diaphragm that can expand downward (similarly as the diaphragm 24 in FIG. 2.) to normalize and compensate for any changes in the internal volume of the water within the globe. This configuration is adequate to compensate for small volume variations in smaller sized globes, but the volume within the inner wall and diaphragm is rather limited.

In the preferred first embodiment, as shown in FIGS. 3–5, the annular base 36 defining the base of the inner wall 42 is not cylindrical, but rather is contoured about 5 mm inboard of the peripheral wall 32, and about 5 mm around and inboard of each of the supports 38, in a clover leaf manner. This contouring greatly increases the area inscribed by the inner wall 42, and greatly increases the volume defined within the wall and diaphragm 44. The inner wall and diaphragm can be flexed and fully inverted (not shown, but similarly to the diaphragm shown in FIG. 2) to normalize and compensate for large variations in volume of the water within the globe.

The annular base 36 has a suitable thickness of about 2–3 mm to provide a stable base for the supports 36 and the inner wall 42. The inner wall and the diaphragm 44 have a suitable thickness of about 1 mm to provide adequate strength for supporting the water in the "as molded" normal, contracted orientation, and adequate flexibility to expand and invert as necessary under increased volume of the water within the globe. The annular base further, preferably, includes a reinforcing gusset 46 extending from the peripheral wall 32 to width of the base of each of the supports 38, having an additional thickness of about 2 mm, for further reinforcing and stabilizing the supports.

The annular base further, preferably, includes a molded-in port 48 that can be utilized for a self-sealingly port for inserting additional liquid into the globe (with a hypodermic needle), or punched-out with a suitable tool to provide a port for sealingly engaging an object (i.e. an electrical cord) extended through the port into the container.

The inboard supports 38 having upper ends 40 with large surface areas allow the ornament to be easily bonded directly onto the upper ends of the supports without the need for the plastic disc (21 in FIG. 2) of the prior art. This eliminates a component, simplifies the manufacturing process, reduces the cost, and improves the quality the globe. The supports are also positioned inboard and independent of the peripheral wall, and any contact and flexing of the peripheral wall does not have any adverse affect on the ornament or bonding of the ornament to the support.

FIGS. 6–9 illustrate an example of a second embodiment of a sealing plug of the present invention having a diaphragm 52 including a central aperture 54 for sealingly engaging a shaft or tube (not shown) utilized for rotating or agitating the ornament or otherwise sealingly engaging an object extended through the plug into the globe. The aperture includes an interior cylindrical flange 55 to provide a larger sealing surface within the aperture.

Figure 7:
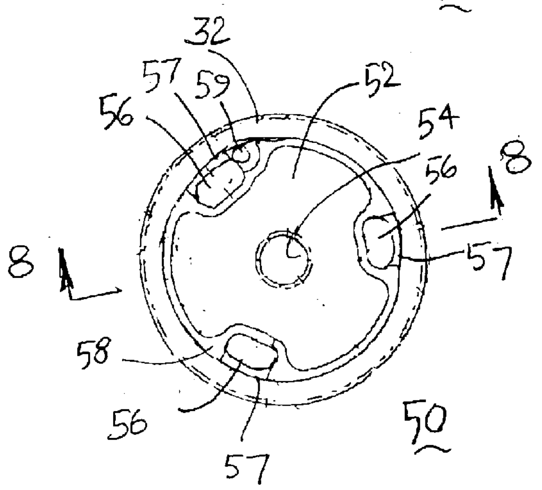
FIG. 7 is a top plane view of the embodiment shown in FIG. 6.

FIG. 7 also illustrates an example of three supports 56 having a generally rectangular or oval cross section of about 10 mm×5 mm for supporting an ornament within the globe. The rectangular shape provides less surface area for supporting the ornament, but provides increased volume within the inner wall and diaphragm of the plug 50 for greater variability of the volume of the fluid within the globe. The flexible inner wall and flexible diaphragm function in a manner similar to that previously described in reference to the example of the first embodiment of the invention.

The annular base further, preferably, includes a reinforcing gusset 57 extending from the peripheral wall 32 to width of the base of each of the supports 56, having an additional thickness of about 2 mm, for further reinforcing and stabilizing the supports.

Figure 8:
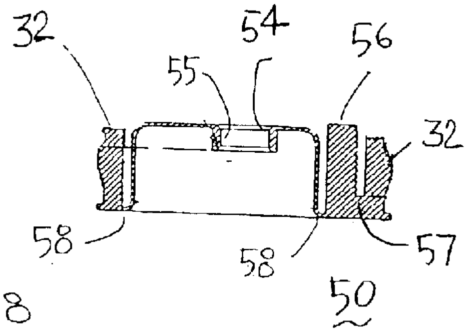
FIG. 8 is a sectional view taken along 8—8 of FIG. 7.
Figure 9:
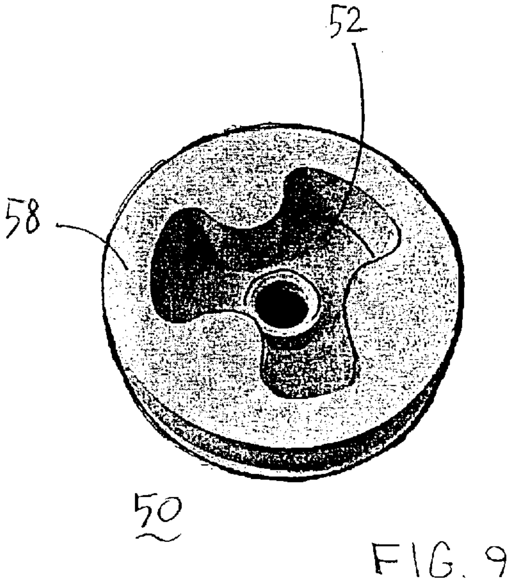
FIG. 9 is a bottom front isometric view of the second embodiment of the sealing plug of the present invention.
Figure 10:
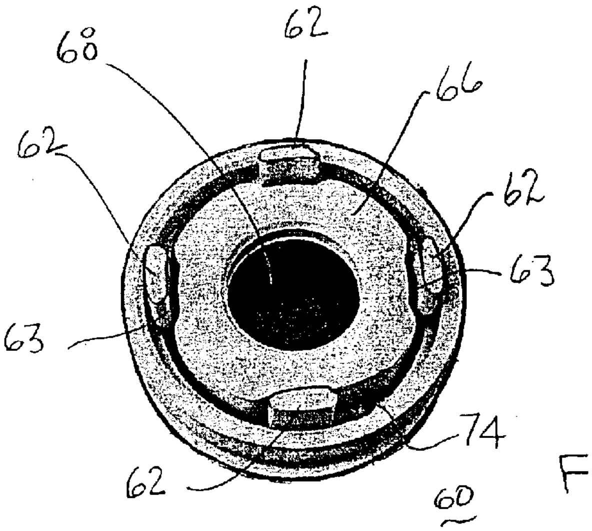
FIG. 10 is a top front isometric view of a third embodiment of the sealing plug of the present invention.

FIGS. 8–9 also illustrate a feature of this second embodiment of the sealing plug 50 in which the flanged annular base 58 extends inwardly from the lower end of the peripheral wall 32. This feature provides a large flat base (see FIG. 9) that can be utilized to support the globe upon assembly.

The annular base 58 further, preferably, includes a molded-in port 59 that can be utilized for a self-sealingly port for inserting additional liquid into the globe (with a hypodermic needle), or punched-out with a suitable tool to provide a port for sealingly engaging an object (i.e. an electrical cord) extended through the port into the container.

FIGS. 10–13 illustrate an example of a third embodiment of the sealing plug 60 of the present invention having four inboard supports 62 that are generally rectangular in cross section of about 10 mm×3 mm, to provide maximum area within the inner wall 64, and maximum volume within the inner wall and the diaphragm 66. The annular base further, preferably, includes a reinforcing gusset 63 extending from the peripheral wall 32 to width of the base of each of the supports 62, having an additional thickness of about 2 mm, for further reinforcing and stabilizing the supports.

This embodiment particularly features the diaphragm having a large aperture 68 to allow large objects to be sealingly extended into the globe. This facilitates large shafts or motorized ornaments for unique water globe effects. The aperture 68 included an interior cylindrical flange 70 to provide a larger sealing surface for the diaphragm. The aperture can be designed to slide on the extended shaft to compensate for changes in the volume of the water within the globe; but in most cases, the aperture is fixed on the extended member and the diaphragm flexes and inverts around the extended member to normalize and compensate for environmental changes related to the water within the globe.

This third embodiment also shows the flanged annular base 72 extending inwardly from the lower end of the peripheral wall 32. This feature also provides a large flat base (see FIG. 13) that can be utilized to support the globe upon assembly.

The annular base 72 also further, preferably, includes a molded-in port 74 that can be utilized for a self-sealingly port for inserting additional liquid into the globe (with a hypodermic needle), or punched-out with a suitable tool to provide a port for sealingly engaging an object (i.e. an electrical cord) extended through the port into the container.

The sealing plug of the present invention can be adapted to seal a liquid filled container having a circular, rectangular or irregular opening and extended skirt; and can be adapted for other liquid filled containers as well as water globes.

While specific embodiments and examples of the present invention have been illustrated and described herein, it is realized that modifications and changes will occur to those skilled in the art. It is therefore to be understood that the appended claims are intended to cover all such modifications and changes as fall within the spirit and scope of the invention.

What is claimed is:

1. A sealing plug, for a liquid-filled container having a lower opening therein with an extended skirt thereon, said plug comprising:

a peripheral wall for sealingly engaging the skirt of the container;

a flanged annular base extending inward from said peripheral wall and having two or more supports extended upward therefrom each having an upper end for supporting an object within the container, and a flexible inner wall extending substantially vertically from said base, and inboard of said peripheral wall and contoured inboard of said supports, having an upper end shorter than the upper ends of said supports, and with a flexible diaphragm extending across the upper end of said inner wall for adjusting to changes in volume and pressure of the liquid within the container.

2. The sealing plug as defined in claim 1, wherein said supports are substantially circular in cross-section.

3. The sealing plug as defined in claim 1, wherein said supports are substantially rectangular in cross-section.

4. The sealing plug as defined in claim 1, wherein said supports are substantially oval in cross-section.

5. The sealing plug as defined in claim 1, wherein said flanged base includes two said supports.

6. The sealing plug as defined in claim 1, wherein said flanged base includes three said supports.

7. The sealing plug as defined in claim 1, wherein said flanged base includes four said supports.

8. The sealing plug as defined in claim 1, wherein said flexible diaphragm further includes a central aperture therein for sealingly engaging an object extended through the plug into the container.

9. The sealing plug as defined in claim 1, wherein said flanged base further includes a sealed port therein for sealingly engaging an object extended through the plug into the container.

10. The sealing plug as defined in claim 1, wherein said flanged base further includes a central aperture therein for sealingly engaging a shaft extended through the plug into the container.

11. The sealing plug as defined in claim 1, wherein said flanged base extends inward from the lower end of said peripheral wall for providing a large flat base thereon.

12. A sealing plug, for a liquid-filled container having a lower opening therein with an extended skirt thereon, said plug comprising:

a peripheral wall for sealingly engaging the skirt of the container;

a flanged annular base extending inward from said peripheral wall and having two or more supports extended upward therefrom each having an upper end for supporting an object within the container, and a flexible inner wall extending upward from said base, and inboard of said peripheral wall and supports, having an upper end shorter than the upper ends of said supports, and having a flexible diaphragm extending across the upper end of said inner wall for adjusting to changes in volume and pressure of the liquid within the container.

* * * * *